(12) United States Patent
Allan et al.

(10) Patent No.: US 7,623,446 B1
(45) Date of Patent: Nov. 24, 2009

(54) MPLS VIRTUAL RINGS

(75) Inventors: David Allan, Ottawa (CA); Peter Ashwood Smith, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 568 days.

(21) Appl. No.: 11/271,939

(22) Filed: Nov. 14, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)
*G06F 15/173* (2006.01)

(52) U.S. Cl. ............... 370/223; 370/224; 370/258; 370/403; 370/404; 370/405; 709/242; 709/243

(58) Field of Classification Search ........... 370/223, 370/258
See application file for complete search history.

(56) References Cited

U.S. PATENT DOCUMENTS

| 5,754,528 | A * | 5/1998 | Uchida | 370/222 |
| 7,283,478 | B2 * | 10/2007 | Barsheshet et al. | 370/238 |
| 2002/0167899 | A1 * | 11/2002 | Thompson et al. | 370/222 |
| 2004/0076427 | A1 * | 4/2004 | Ikeda et al. | 398/5 |
| 2005/0094577 | A1 * | 5/2005 | Ashwood-Smith | 370/257 |
| 2005/0163101 | A1 * | 7/2005 | Ashwood Smith et al. | 370/351 |
| 2007/0280251 | A1 * | 12/2007 | Wang et al. | 370/395.1 |

OTHER PUBLICATIONS

Y. Rekhter and E. Rosen, Request for Comments 3107, May 2001, Internet Engineering Task Force, pp. 3 and 6.*
Y. Rekhter and T. Li, Request for Comments 1771, Mar. 1995, Internet Engineering Task Force, p. 42.*
Dan Guo, James Fu, Nasir Ghani, Hybrid Mesh-Ring Optical Networks and Their Routing Information Distribution Using Opaque LSA, Network Working Group: Internet Draft, Mar. 7, 2001.*
E. Rosen, A. Viswanathan and R. Callon, Multiprotocol Label Switching Architecture, Network Working Group Request For Comments 3031, Jan. 2001.*
Albert Herrera, Russ White, Pankaj Jha, Raj Sharma, Kaled Amer, A framework for IP over RRR, Internet Engineering Task Force Internet Draft, Jun. 2001.*

* cited by examiner

*Primary Examiner*—Daniel J. Ryman
*Assistant Examiner*—Christopher Crutchfield
(74) *Attorney, Agent, or Firm*—Kent Daniels; Blake, Cassels & Graydon LLP (57) ABSTRACT

A virtual ring representing a community of interest is constructed from an interconnected mesh of nodes in a packet network. The virtual ring instantiates ring labels in respective forwarding tables for each node in the virtual ring and then advertises the ring labels to all other nodes in the virtual ring, for example by flooding BGP advertisements. Data packets entering the ring are assigned a ring label which is then stripped off when exiting the ring. The data packets are forwarded around the virtual ring using the ring labels. The virtual ring can operate using BGP/LDP Multi Protocol Label Switching (MPLS). Multiple virtual rings can be bridged together using a central hub or alternatively multiple virtual rings can be redundantly bridged together using tandem hubs.

15 Claims, 4 Drawing Sheets

MPLS VIRTUAL RINGS

CROSS-REFERENCE TO RELATED APPLICATIONS

This is the first application filed for the present invention.

TECHNICAL FIELD

The present invention relates in general to packet-switched networks and in particular to the use of MPLS to build virtual circuits across IP networks.

BACKGROUND OF THE INVENTION

In a Multi Protocol Label Switching (MPLS) network, incoming packets are assigned a label by a Label Edge Router (LER). Packets are forwarded along a Label Switched Path (LSP) where each Label Switching Router (LSR) makes forwarding decisions based solely on the contents of the label. At each hop, the LSR strips off the existing label and assigns a new label which informs the next hop how to forward the packet.

A Label Switching Path (LSP) can be used for a number of purposes, such as guaranteeing a certain level of performance, routing packets around congested portions of a network, or creating IP tunnels for a virtual private network (VPN).

In the context of establishing a virtual private network, the prior-art approach to VPN multicasting is to instantiate large amounts of state in the core. Furthermore, VPN multicasting offers little or no service assurance or tools for OAM (Operations, Administration and Maintenance).

Accordingly, it would be highly desirable to provide a virtual private network that does not instantiate large amounts of state in the core, and that furthermore offers service assurance and OAM tools.

SUMMARY OF THE INVENTION

An object of the present invention is to provide a virtual ring and a method for constructing a virtual ring from a plurality of network nodes. The virtual ring is bi-directional although with this technique unidirectionality is possible, but less desirable as bi-directionality enhances the set of resiliency options, and permits load sharing across both directions. In general, the virtual ring connects a plurality of nodes that form a community of interest. As will be elaborated below, each node instantiates two ring labels (east & west), installs these labels in the local forwarding table and then advertises these ring labels to the other nodes in the community. A distributed ring computation algorithm computes an optimal virtual ring using knowledge of network topology obtained from routing protocols. The local view of the optimal ring allows the node to select which ring advertisements are from the optimal immediate neighbors. The ring label advertisements can also be used to determine eastbound and westbound directions. The node can then locally configure connectivity between itself and its immediate ring neighbors. When all ring nodes have done so the ring is complete. Data packets entering the virtual ring are assigned a ring label identifier which is then stripped off the data packet when the data packet exits the ring.

The virtual ring offers a number of advantages in terms of creating an efficient and resilient virtual private network for a community of interest. Firstly, since each node instantiates ring labels for the community of interest and such rings only impose state on nodes in the community of interest, the virtual ring does not instantiate any state in the core.

Secondly, the ring architecture of the virtual ring offers a number of advantages in terms of service assurance and OAM tools, such as ring folding and fast-resiliency mechanisms to ensure network survivability. Such benefits may be derived by implementing ring protocols and/or multicast protocols that are well known to those skilled in the art.

Thus, an aspect of the present invention provides a method of constructing a virtual ring from a plurality of nodes in a packet network. The method includes the steps of: defining a community of interest by selecting nodes from an interconnected mesh of nodes in the packet network; determining inter-node connectivity for each node in the community of interest with respect to all other nodes in the community of interest; computing an optimal virtual ring to connect all the nodes in the community of interest; advertising the east/west ring labels to all nodes in the community of interest; determining which are immediate neighbor nodes on the optimal ring for each node and instantiating the ring labels in respective forwarding tables for each node in the community of interest to enable efficient forwarding of data packets to nodes in the community of interest. It should be noted that "east/west" is a convention used in this specification to describe the directions around the ring, analogous to clockwise and counterclockwise, although it should be understood that the ring is not necessarily planar in actual construction. This convention is adopted to provide universal agreement on mapping connectivity to ring directionality in the present method to enable the ring to be established successfully.

In one embodiment, the method further includes the step of configuring a node as a hub for bridging multiple rings together.

In one embodiment, the further includes the step of configuring two adjacent nodes as tandem hubs to redundantly bridge multiple rings together.

Another aspect of the present invention provides a method of forwarding data packets through a virtual ring of nodes that connect a community of interest in a packet network. The method includes the steps of: computing the virtual ring connecting all nodes of the community of interest; advertising ring labels to the nodes in the community of interest; (the actual order of this first two steps is not critical), determining neighboring nodes for each node in the community of interest and east and west labels for the neighboring nodes; instantiating the ring labels in forwarding tables at each node in the community of interest; assigning a ring label identifier to each data packet entering the virtual ring at an originating node; forwarding the data packet through the virtual ring; and stripping the ring label identifier from the data packet when the data packet exits the virtual ring at the originating node.

In one embodiment, the advertising step includes a step of flooding BGP advertisements to the community of interest.

In another embodiment, the forwarding is performed using MPLS.

Yet another aspect of the present invention provides a virtual ring for transporting data packets to one or more nodes that form part of a community of interest within a packet network. The virtual ring includes a plurality of networked nodes connected together to define the virtual ring linking the community of interest; a forwarding table at each node in the virtual ring, the forwarding table including ring labels for immediate neighbor nodes in the ring (extracted from the set of advertisements received), the ring labels having being advertised to other nodes in the community of interest to determine east and west labels for neighboring nodes for constructing the virtual ring; packet-labeling means for assigning ring label identifiers to data packets entering the virtual ring; means for forwarding data packets around the virtual ring; and label-stripping means for stripping the ring label identifiers from data packets exiting the ring.

This technique is considered to be a multicast specific complement to the mesh connectivity offered by the underlying MPLS network, however the ring construct may be used as the primary mode of connectivity for both unicast and multicast traffic, and therefore may choose to also take advantage of ring concepts such as destination stripping, spatial re-use, etc. understood to those versed in the art.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
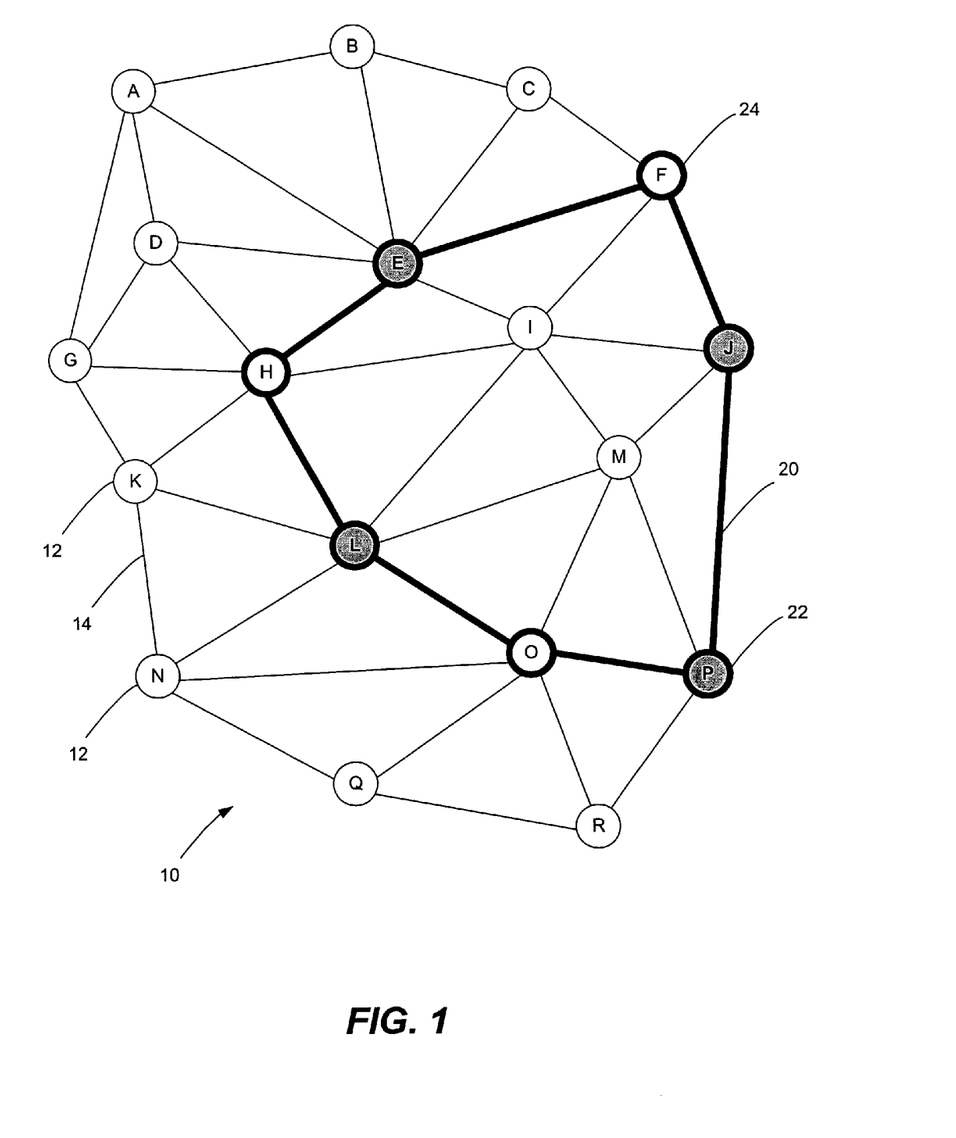
FIG. 1 is a schematic depiction of a virtual ring constructed from a mesh of interconnected network nodes in a packet network in accordance with embodiments of the present invention.

FIG. 1 is a schematic depiction of a virtual ring constructed from a mesh of interconnected network nodes in a packet network in accordance with embodiments of the present invention.

As shown in FIG. 1, a packet network, generally designated by reference numeral 10, includes a plurality of interconnected network nodes 12, each of which is connected to one or more neighboring nodes in the network by a communication link 14 to thus form a mesh of interconnected network nodes. As is well known in the art, data packets are routed from node to node (i.e. "hop-by-hop") in a connectionless manner. Although FIG. 1 shows eighteen (18) interconnected nodes identified as Nodes A through R, it should be understood that the present invention is applicable to any number of nodes.

As shown in FIG. 1, a community of interest can be defined by selecting a subset of the nodes in the network and designating these nodes to be "community-of-interest nodes" 22. In the example shown in FIG. 1, the community of interest is defined as Nodes E, J, L and P. In other words, Nodes E, J, L and P are community-of-interest nodes 22. Once the community of interest is defined (all member nodes identified, and all member nodes known to the other nodes in the community), a virtual ring 20 is constructed to link the community of interest together. A virtual ring (VR) offers a number of benefits in terms of security, efficiency and resiliency/survivability. As will be elaborated below, the virtual ring 20 uses a distributed ring algorithm to compute an optimal ring. The optimal virtual ring will typically transit non-community nodes 24 that, though they are not community-of-interest nodes 22, are nonetheless included as part of the virtual ring in order to optimize packet transport to the community-of-interest nodes 22. Note that although transited by the virtual ring, they are not "ring aware", as the ring segment is simply overlaid upon the pre-existing mesh connectivity offered by the underlying network. Therefore, referring again to the example shown in FIG. 1, the non-community nodes 24 are Nodes F, H and O. To recap, therefore, the VR 20 can be constructed from community-of-interest nodes 22 and non-community nodes 24 or alternatively the VR can be constructed exclusively of community-of-interest nodes (where the community of interest can be optimally linked together in a ring without enlisting any intermediary non-community nodes). However, this assumes a sufficiently dense membership in the community of interest such that they are all directly connected. For many applications where there are a large number of communities with sparse membership, the common case is that each ring will transit non-member nodes and the non-member nodes likely significantly outnumber the member nodes.

Virtual ring connectivity for any arbitrarily selected community of interest in the packet network can thus be established using a distributed ring algorithm which is combined with an advertisement-flooding mechanism (e.g. BGP/LDP for an MPLS implementation) and a means for multiplexing traffic to any node from any other node in the network. In this scenario, all nodes in the community have a common view of the network topology (via the routing system) and a common view of the community of interest (e.g. via BGP advertisements). As a result, network nodes that constitute a community of interest can, acting independently and employing common algorithms to compute connectivity, interconnect themselves to form a virtual ring. Hence, the ring computation algorithm is said to be "distributed" since each node determines its neighboring nodes and east/west labels independently of the other nodes in the community of interest. The virtual ring can then be used for broadcast, multicast, highly resilient interconnect or other applications where ring architectures are known to provide benefits and advantages.

A method of constructing a virtual ring in accordance with the preferred embodiment of the present invention includes the following steps: (1) Each node is a assumed to know a priori the connectivity graph of all the nodes in the network (via an IGP—Interior Gateway Protocol) and is assumed to have full (i.e. "any-to-any") connectivity to all other nodes or at least the ability to signal connectivity to all other nodes; (2) Each node instantiates ring labels for the community of interest in its own forwarding table and advertises those ring labels to all of its neighbors via BGP (Border Gateway Protocol); (3) Each node will then collect all BGP advertisements for the other nodes in the community of interest; (4) Each node independently runs the distributed ring algorithm for the set of nodes in the community of interest to establish the optimal interconnect ring on the IGP graph, i.e. on the graph of inter-node connectivity; (5) Once the node has established the optimal ring, it knows implicitly who its immediate neighbors are; (6) Knowing its immediate neighbors' it also can revisit the received BGP advertisements and obtain the east and west labels that the immediate neighbors expect its neighbor to use when sending to it; (7) Each node then determines which direction is eastbound and which is westbound, where one suitable algorithm (of many possible) will be elaborated below with reference to FIG. 2; (8) Each node cross-connects its immediate west neighbor's west label to the west label offered by the node, and cross-connects its immediate east neighbor's east label to the east label offered by the node; (9) Finally, when all nodes have completed these cross-connecting operations, a complete virtual ring will exist. The ring is termed to have converged.

As will now be appreciated from the foregoing paragraph, the method and system in accordance with the preferred embodiment can create an MPLS virtual ring from an interconnected mesh of Label Switching Routers (or network nodes) by flooding BGP advertisements to community of interest nodes. The combination of BGP communities (or "route targets") combined with the node ID ("BGP next hop identifier") augmented with a new form of label advertisement ("east and west labels") and normal Interior Gateway Protocol (IGP) information is sufficient for a subset of nodes on an arbitrary graph to figure out how to hook themselves up in a ring. When BGP advertisements are flooded, the route target is used to identify whether any of the BGP advertisements are of interest to nodes in the particular community of interest corresponding to the route target. The BGP next hop identifier identifies the node of origin, and locates that node on the IGP graph. As will be appreciated, since the MPLS implementation is a destination-based forwarding paradigm with logical single hops between each node in the community of interest offered by the underlying IGP/LDP network, ring information does not require personalization. In other words, any node receiving a BGP advertisement and IGP topology information has sufficient information to determine its optimal immediate neighbors and to set up connectivity based upon MPLS labels.

Furthermore, as will now be appreciated from the foregoing, the east/west labels provide a binding for each node-to-node "dataplane". As is known by those of ordinary skill in the art, a "dataplane" is a virtual network path that carries data between nodes. For the sake of completeness, dataplane operation will now be described. When a node receives a data packet to be relayed along a direction of the virtual ring, it sends that data packet to the BGP next hop address with the node's ring label nested. This is similar to RFC 2547, which is currently the most commonly deployed version of P2C, or "Point-to-Cloud" service. In RFC 2547, a hierarchical two-label stack is used in a destination-based forwarding paradigm in which a transport label is used to reach the egress Provider Edge (PE) and a service label is used to reach the egress customer interface on the PE. The transport layer is primarily connectionless whereas the service layer takes network layer connectivity for granted. Similarly, in the MPLS virtual ring in accordance with the preferred embodiment of the present invention, the dataplane employs a top label for identifying the BGP next hop address and a nested label for identifying the ring corresponding to the particular community of interest, which may be a common replication infrastructure common to a VPN or may be directly associated with a particular multicast group, or even to the granularity of a particular source in a multicast group. The actual criteria as to what constitutes a community of interest and the granularity of said group may be arbitrary.

The underlying MPLS connectivity preferably employs Label Distribution Protocol (LDP) for the distribution of label binding information to LSRs in the MPLS network, as is known in the art. Using LDP improves the resiliency of the ring as individual ring segments will "self heal" as a consequence of connectionless behavior at the LDP layer. However, it should be noted that any packet switched network that may encapsulate MPLS packets may be employed (e.g. Ethernet).

When a node receives a data packet, the receiving node "pops" the ring label and may then take any of several actions on the received payload. The data may be replicated locally and/or relayed along to the next hop of the ring with the next label for the ring in that direction being pushed, or the packet may be removed from the ring. Therefore, when a packet arrives from outside the ring, a packet-labeling means assigns ring label identifiers to data packets entering the virtual ring at that node for the purpose of subsequently stripping the packet once it has completely traversed the ring. In other words, each node of the virtual ring also includes a label-stripping means for stripping the ring label identifiers from data packets exiting the ring.

Figure 2:
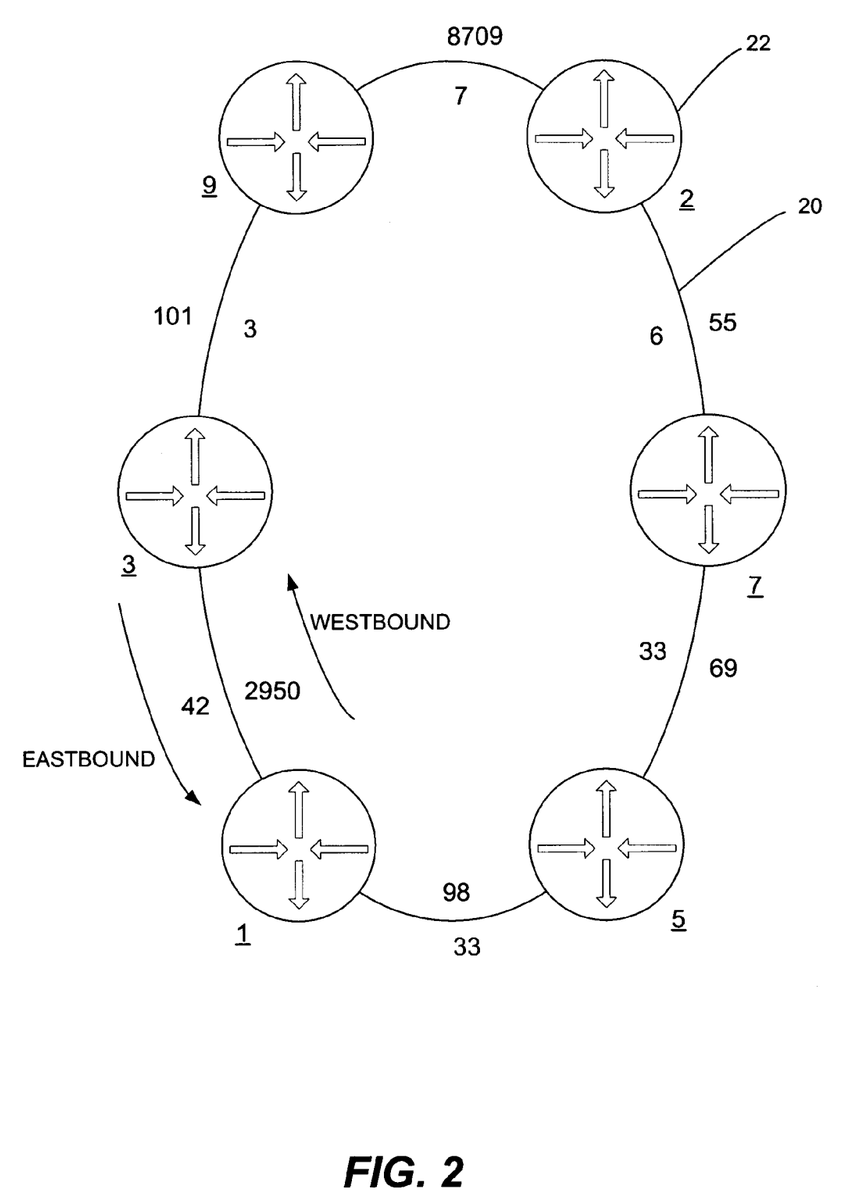
FIG. 2 is a schematic depiction of a method of defining eastbound and westbound directions for the virtual ring in accordance with another aspect of the present invention.

FIG. 2 is a schematic depiction of a method of defining eastbound and westbound directions for the virtual ring in accordance with another aspect of the present invention. Successful establishment of a ring requires concurrence amongst all nodes as to directionality of the immediate neighbors. In the preferred embodiment, the virtual ring implements a direction-defining algorithm for eastbound and westbound directions. Any algorithm will suffice, and the one offered in the following description serves to illustrate that this can be readily accomplished. In this direction-defining algorithm, ring direction can be determined by first identifying the node with the lowest BGP next hop address (or BGP next hop identifier, typically the device's loopback address) and then determining which neighbor has the next highest address. For example, with reference to FIG. 2, let us assume that the virtual ring has been computed to include Nodes 1, 3, 9, 2, 7, 5. The lowest BGP next hop identifier in the set is known by all nodes in the ring to be Node 1. All nodes in the ring also know that Node 1 has two neighbors, namely Nodes 3 and 5. Since Node 3 is the lower of the two values, i.e. the closest address, the ring direction 1, 3, 9, 2, 7, 5, 1 is designated (arbitrarily) as westbound while the opposite direction around the ring, namely 1, 5, 7, 2, 9, 2, 1 is consequently designated as eastbound. It should be emphasized that designating the direction that has the closest address to the lowest BGP as being westbound is purely arbitrary, and therefore could just as arbitrarily be designated as eastbound with the opposite direction being consequently designated as westbound. Successful application of the invention therefore requires a directionality convention.

Having determined each node's immediate neighbors, and which direction is east and which is west, and knowing the immediate neighbor's east and west labels, the nodes can then construct the virtual ring.

FIG. 2 illustrates an MPLS virtual ring constructed from six (6) Label Switching Routers (LSRs) which are designated as LSRs 1, 3, 9, 2, 7 and 5. For the purposes of this specification, the expression "node" includes an LSR. In other words, in an MPLS network, each LSR acts as a node as this expression is to be understood in this specification.

As shown in FIG. 2, LSR 1 has offered labels 42E and 98W. LSR 2 has offered labels 55E and 7W. LSR 3 has offered labels 101E and 2950W. LSR 5 has offered labels 33E and 392W. LSR 7 has offered labels 69E and 6W. LSR 9 has offered labels 8709E and 3W. Therefore, for example, LSR 1 receives data from LSR 5 on 98 westbound (98W) and sends or forwards data westbound to LSR 3 on 2950 westbound. LSR 1 receives data from LSR 3 on 42 eastbound and sends or forwards data eastbound to LSR 5 on 33 eastbound.

Figure 3:
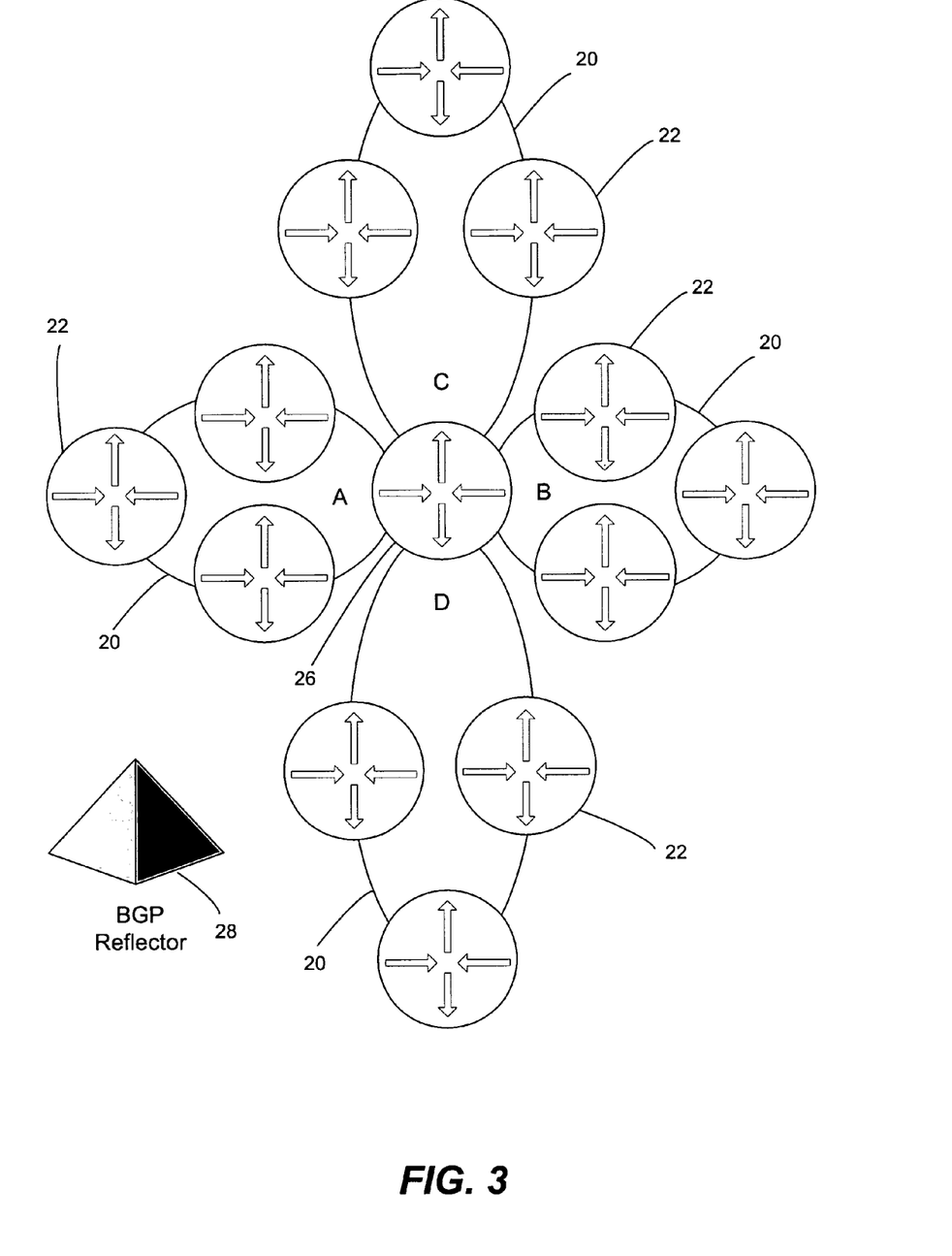
FIG. 3 is a schematic depiction of four virtual rings interconnected by a central hub node that bridges the four virtual rings together, in accordance with another aspect of the present invention.
Figure 4:
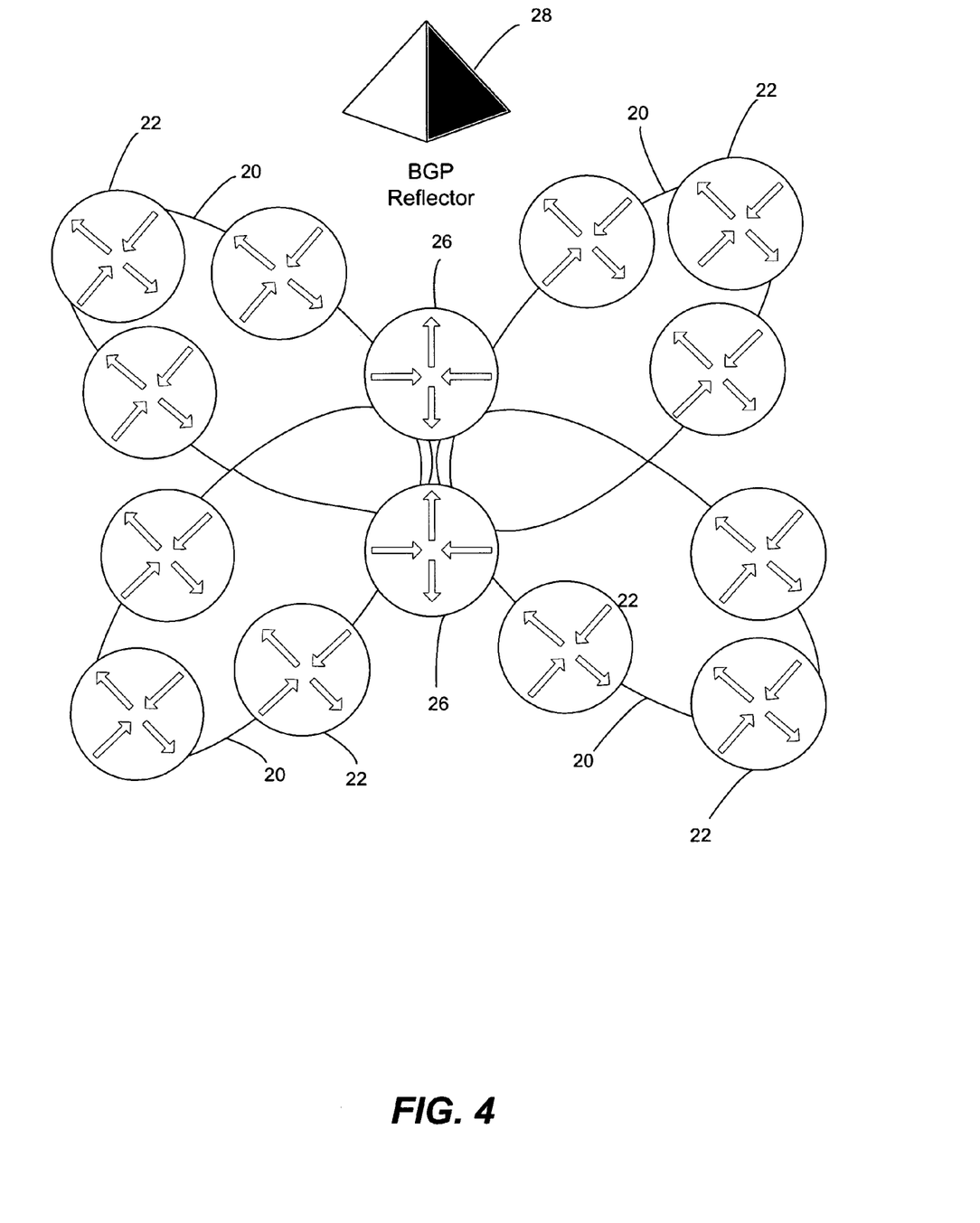
FIG. 4 is a schematic depiction of four virtual rings interconnected by a pair of tandem hub nodes that redundantly bridge the four virtual rings together, in accordance with yet another aspect of the present invention.

In another embodiment, as illustrated in FIGS. 3 and 4, a plurality of virtual rings can be bridged together using one or more hubs (i.e. hub nodes) so as to reduce the computational load (in implementing the distributed ring algorithm) and, furthermore, to compartmentalize the network for minimizing the potential impact of a network failure.

FIG. 3 is a schematic depiction of four virtual rings 20 interconnected by a central hub node 26 that bridges the four virtual rings together, in accordance with another aspect of the present invention. As shown in FIG. 3, each VR 20 has a plurality of edge nodes 22. In the specific case of MPLS virtual rings, the edge nodes and hub node are Label Switching Routers (LSRs). Optionally, a BGP route reflector 28 can be provided to reduce convergence time, as is known in the art.

"Hubbing" of virtual rings is advantageous for multiple reasons. A single large ring may have excessive latency as a packed launched in one direction must transit every node in sequence. As will be appreciated by those of ordinary skill in the art, a ring computation algorithm has a computational complexity that grows exponentially with the size of the community of interest (nominally termed an NP complete problem). The "hubbing" of rings on ABRs (Area Border Routers) therefore reduces the computational load and thus caps the convergence time for re-computing new rings. For example, it is computationally much more tractable to compute 4 rings of 100 nodes each than to compute a single 400-node ring as not only is the size diminished (a key consideration for problems with exponential compute properties), but the problem is also partitioned. Assuming the computation time is proportional to the square of the number of nodes, computation of a single 400-node ring would take $400^2$ or 160,000 time units whereas computation of four 100-node rings would take $4 \times 100^2$ or 40,000 time units at the hub nodes (which participate in all rings) and only $100^2$ time units at non-hub nodes. Furthermore, hubs have the added benefit of compartmentalizing or partitioning the network so as to reduce the impact, or "footprint", of a network failure as disruption of traffic only occurs on the affected ring.

As shown in FIG. 3, four virtual rings 20 designated as A, B, C and D can be "hubbed" or bridged together by assigning one or more nodes to function as a "hub" or "hub node" 26. In other words, the hub 26 will bridge together separate communities of interest or route targets (RTs). Although the present invention does not address ring protocols, a clear requirement would be that the hub 26 modifies dataplane traffic bridged between virtual rings to indicate that the hub is the origin in subsequent bridged rings and will properly strip traffic bridged into subsequent rings by the hub. This can be accomplished by tagging the frame (or packet) as having been introduced to the ring by a specific node in order to facilitate subsequent stripping of the packet when it departs the ring. The non-hub LSRs in each VR are also known as "edge nodes" 22. These edge nodes 22 configure themselves to form a virtual ring by advertising east/west labels, as was described above. The edge nodes 22 receive VPN multicast traffic and filter the traffic according to local CE (Customer Edge) membership. The source Provider Edge node (i.e. the node where the packet originates) strips the ring label identifier from data packets as the packets exit the ring.

Each VR 20 thus is associated with a route target (RT) that identifies information associated with the VR targeted to the community of interest in the BGP advertisements. For the sake of clarity, it should be understood that each VR could serve a distinct sub-community of interest and that the entire system of four sub-rings that are hubbed together can be thought of a general community of interest. Alternatively, each VR or route target can be thought of as its own community of interest being hubbed to other (related) communities of interest (i.e. other VRs) via the hub node. This enables hierarchical layering of rings to provide a interaction between communities of interest with overlapping or hierarchical membership and access.

FIG. 4 is a schematic depiction of four virtual rings 20 interconnected by a pair of tandem hub nodes 26 that redundantly bridge the four virtual rings 20 together, in accordance with yet another aspect of the present invention. As was noted above, a BGP reflector 28 can be provided to reduce convergence time.

Referring to FIG. 4, the tandem hubs 26 function analogously to SONET matched nodes. By using BGP communities, it is possible for multiple hubs to bridge multiple rings, and that protocols can be devised for redundant bridging to avoid both hubs simultaneously replicating on all rings.

In yet another embodiment, redundant hubs may be interconnected via a logical mesh which uses a simple spanning tree algorithm or other mechanism to establish a loop-free interconnect between the set of rings.

It should be readily appreciated that the embodiments shown in FIGS. 3 and 4 are illustrative only and that the number of virtual rings, the number of nodes and the number of hubs could be varied.

Creating virtual rings in accordance with embodiments of the present invention offers numerous advantages and benefits, namely: (i) that there is no per-VPN or multicast group state in the core, i.e. all state is confined to the Provider Edge (PE) nodes in the specific community of interest; (ii) that the required replication capacity at any given node is capped; (iii) that broadcast replication is relatively efficient, i.e. in the preferred embodiment, the node that originates data traffic onto the ring also strips the ring label identifier from the data packet once the packet has made it entirely around the ring; (iv) that virtualization enables nearly infinite subdividing into any number of communities of interest; (v) that the ring architecture allows one to implement OAM tools for performing diagnostics such as ping (in particular, for a ring, self-pinging) and traceroute; (vi) that the ring architecture is highly resilient, i.e. network survivability is enhanced, e.g. through ring folding or other fast-resiliency mechanisms; (vii) adding destination filtering allows multicast to be carried over the ring, i.e. destination nodes can be made to simply silently discard traffic that is not of interest to it; and (viii) nesting labels enables the ring to also function as a unicast trunking mechanism.

Although BGP/LDP MPLS represents the best known mode of implementing the present invention, it should be understood that any other transport layer with similar properties could be used, for example IP tunneling using GRE (Generic Router Encapsulation), as defined in RFC 1702 or Ethernet.

The embodiments of the invention described above are intended to be exemplary only. The scope of the invention is therefore intended to be limited solely by the appended claims.

What is claimed is:

1. A method of constructing a virtual ring from a plurality of nodes in a packet network, the method comprising the steps of:

defining a community of interest by selecting nodes from an interconnected mesh of nodes in the packet network;

determining inter-node connectivity for each node in the community of interest with respect to all other nodes in the community of interest;

computing an optimal virtual ring to connect all the nodes in the community of interest;

advertising ring labels to all nodes in the community of interest;

determining neighboring nodes in the community of interest for each node in the community of interest and selecting east and west labels for the neighboring nodes from a set of advertisements received at each node in the community of interest, wherein the step of determining east and west labels comprises the step of first determining eastbound and westbound directions according to a lowest BGP next hop identifier and its closest next hop identifier; and instantiating the ring labels in respective forwarding tables for each node in the community of interest to enable efficient forwarding of data packets to nodes in the community of interest.

2. The method as claimed in claim 1 wherein the packet network uses Multi Protocol Label Switching (MPLS) to forward data packets to Label Switching Routers linked together as the nodes of the virtual ring.

3. The method as claimed in claim 1 wherein the advertising step comprises a step of flooding the ring with BGP advertisements having identifiers for identifying the community of interest.

4. The method as claimed in claim 1 further comprising the step of configuring a node as a hub for bridging multiple rings together.

5. The method as claimed in claim 1 further comprising the step of configuring two adjacent nodes as tandem hubs to redundantly bridge multiple rings together.

6. A method of forwarding data packets through a virtual ring of nodes that connect a community of interest in a packet network, the method comprising the steps of:

computing the virtual ring connecting all nodes of the community of interest;

advertising ring labels to the nodes in the community of interest;

determining neighboring nodes in the community of interest for each node in the community of interest and selecting east and west labels for the neighboring nodes from a set of advertisements received at each node in the community of interest, wherein selecting east and west labels comprises determining eastbound and westbound directions according to a lowest BGP next hop identifier and its closest next hop identifier;

instantiating the ring labels in forwarding tables at each node in the community of interest;

assigning a ring label identifier to each data packet entering the virtual ring at an originating node;

forwarding the data packet through the virtual ring; and stripping the ring label identifier from the data packet when the data packet exits the virtual ring at the originating node.

7. The method as claimed in claim 6 wherein the advertising step comprises a step of flooding the ring with BGP advertisements.

8. The method as claimed in claim 6 wherein the forwarding is performed using MPLS.

9. The method as claimed in claim 6 further comprising the step of configuring one of the nodes in the community of interest as a hub for bridging together a plurality of virtual rings.

10. The method as claimed in claim 6 further comprising the step of configuring two adjacent nodes in the community of interest as tandem hubs to redundantly bridge together a plurality of virtual rings.

11. A virtual ring for transporting data packets to one or more nodes that form part of a community of interest within a packet network, the virtual ring comprising:

a plurality of networked nodes connected together to define the virtual ring linking the community of interest;

a forwarding table at each node in the virtual ring, the forwarding table including ring labels for all other nodes in the ring, the ring labels having being advertised to other nodes in the community of interest to determine east and west labels for neighboring nodes for constructing the virtual ring, wherein determining the east and west labels comprises determining eastbound and westbound directions according to a lowest BGP next hop identifier and its closest next hop identifier;

packet-labeling means for assigning ring label identifiers to data packets entering the virtual ring;

means for forwarding data packets around the virtual ring; and label-stripping means for stripping the ring label identifiers from data packets exiting the ring.

12. The virtual ring as claimed in claim 11 wherein the ring labels are advertised by flooding BGP advertisements to neighboring nodes.

13. The virtual ring as claimed in claim 11 wherein the means for forwarding data packets implements an MPLS forwarding paradigm for forwarding data packets to Label Switching Routers connected together as the nodes in the virtual ring.

14. The virtual ring as claimed in claim 11 wherein one of the nodes in the community of interest is designated to be a hub for bridging a plurality of virtual rings.

15. The virtual ring as claimed in claim 11 wherein two adjacent nodes in the community of interest are designated to be tandem hubs for redundantly bridging a plurality of virtual rings.

* * * * *

UNITED STATES PATENT AND TRADEMARK OFFICE
CERTIFICATE OF CORRECTION

PATENT NO. : 7,623,446 B1　　　　　　　　　　　　　　　　　　　　　　　　　　Page 1 of 1
APPLICATION NO. : 11/271939
DATED : November 24, 2009
INVENTOR(S) : Allan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Twenty-sixth Day of October, 2010

David J. Kappos
*Director of the United States Patent and Trademark Office*